(No Model.)
W. H. BRUNT.
MOLD FOR GLASSWARE.
No. 281,610.           Patented July 17, 1883.
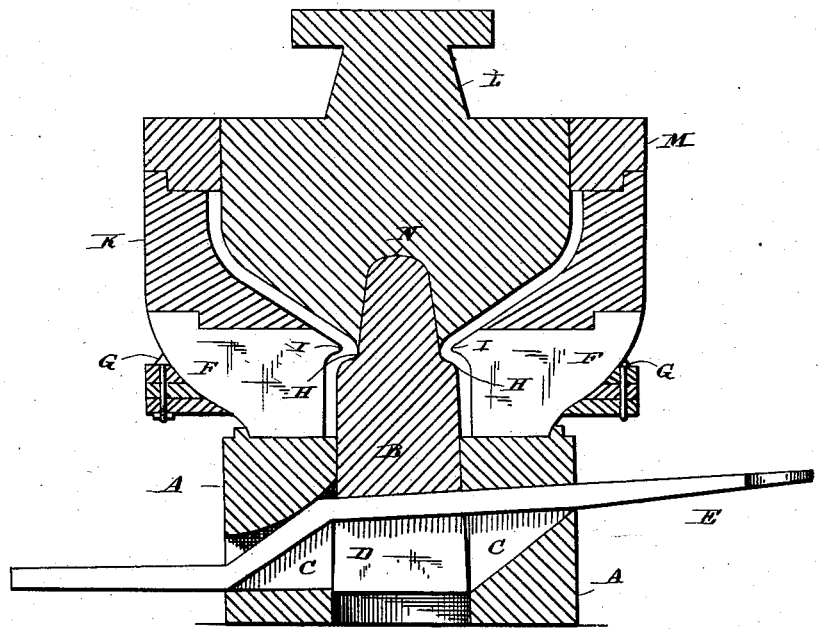

UNITED STATES PATENT OFFICE.

WILLIAM H. BRUNT, OF PITTSBURG, PENNSYLVANIA, ASSIGNOR TO VOIGT, WARD & CO., OF SAME PLACE.

MOLD FOR GLASSWARE.

SPECIFICATION forming part of Letters Patent No. 281,610, dated July 17, 1883.

Application filed January 4, 1883. (No model.)

*To all whom it may concern:*

Be it known that I, WILLIAM H. BRUNT, of Pittsburg, in the county of Allegheny, and in the State of Pennsylvania, have invented certain new and useful Improvements in Molds for Glassware; and I do hereby declare that the following is a full, clear, and exact description thereof, reference being had to the accompanying drawings, and to the letters of reference marked thereon, making a part of this specification.

This invention relates to certain improvements in molds for glassware and other similar articles, and it is specially designed for the manufacture of lamp-shade holders and other articles having contracted portions at some point or points.

The object of the invention is to provide a mold whereby open-ended cylindrically-shaped articles may be formed with contracted parts and readily delivered from the mold, as more fully hereinafter specified. These objects I attain by the means illustrated in the accompanying drawing, in which is represented a vertical sectional view of my improved mold.

The letter A indicates the base or lower section of the mold, which is provided with a vertical central aperture, through which is adapted to work a vertical plunger, B. The said base is slotted transversly, as indicated by the letter C, and the plunger is also transversely slotted, as indicated by the letter D. Through the respective slots is passed a bent rod, E, which may be shifted lengthwise, and the slot in the base or lower section of the mold is so shaped that by moving the rod back and forth the plunger may be elevated or depressed, as may be desired.

The letter F indicates an intermediate section of the mold. This is constructed in two parts, having lugs at diametrically-opposite sides, which may be temporarily fastened together by means of pins or pintles G in such manner that the parts may be separated for the purpose of removing the article, as more fully hereinafter specified. The plunger B is contracted at the point H, and the opening of the intermediate section of the mold is correspondingly contracted, as indicated by the letter I in the drawing.

The letter K indicates the upper section of the mold, which sets in a suitable recess in the upper face of the intermediate section of the mold, and which can be removed from the same when required for the purpose of discharging the finished article, the opening in the said section, which is adjacent to the intermediate mold-section, being of larger diameter than the contracted portion of the said latter section, or of larger diameter than the smaller end of the article to be formed, the object being to admit of the ready removal of the article, as more fully hereinafter specified.

The letter L indicates an upper plunger, which is adapted to fit within the upper section of the mold, and M an annular guide through which said plunger passes. The said guide is shouldered on its lower face, and fits in a shouldered recess in the upper face of the upper mold-section, so as to guide the upper plunger truly into said upper section and leave the proper space for the material to be molded. Between the lower plunger and the intermediate mold-section is left a similar space connecting with that above mentioned to form the neck of the article, as indicated in the drawing. The lower part of the upper plunger is provided with a central recess, N, into which the contracted upper end of the lower plunger is adapted to pass.

It is evident that upper and intermediate sections may be formed in parts and detachably connected, so that the whole may be opened vertically to deliver the article; but the first-mentioned method is preferable, as the vertical seam in the body of the article is thereby avoided.

The operation of my invention is as follows: The several sections of the mold are properly arranged together, and the lower plunger is elevated by means of the bent rod, as before mentioned. The molten material is then inserted in the upper mold-section around the upper end of the lower plunger, forming an annulus around the same. The upper plunger is then driven in, forcing the glass into the spaces between the mold and the plunger, thus forming the article. To remove the article the parts of the intermediate mold-section are separated, and the upper section is then lifted off with the molded article. The guide and plunger are then removed from the upper section, which is inverted by means of suitable handles, so as to discharge the article.

The invention in the present instance has been described and illustrated as applied to the construction of a lamp-shade; but it is evident that it may be otherwise applied where it is desirable to form irregular articles of glass or other similar ware with central openings.

I would not have it understood that I am laying claim, broadly, to the combination, with a glass-mold, of a plunger located below the same and adapted to work in an aperture formed in the lower end of the mold, as such, to my knowledge, is already known; but what I do claim as distinguished from the device here alluded to is distinctly and clearly pointed out in my claims below.

Having thus described my invention, what I claim, and desire to secure by Letters Patent, is—

1. The combination, with a glass-mold constructed of vertically-separable sections having an annular radially-contracted portion, of the lower plunger adapted to work therein, and provided on its periphery with a correspondingly-contracted portion, whereby a shoulder or contraction is given the article, and the same may be removed, substantially as described.

2. The combination, with a glass-mold embodying therein several sections, one of which has its smaller annular opening larger than the smaller end of the article, and another of which is vertically separable and provided with an annular contraction, of the plunger having a corresponding contraction and adapted to work therein, whereby the article is rendered readily removable and formed with a shoulder, substantially as described.

In testimony whereof I affix my signature, in presence of two witnesses, this 2d day of January, 1883.

WILLIAM H. BRUNT.

Witnesses:
CHARLES D. DAVIS,
J. J. McCARTHY.